(12) United States Patent
Yoshinaga

(10) Patent No.: US 11,785,915 B2
(45) Date of Patent: Oct. 17, 2023

(54) WATER ABSORPTION TREATMENT MATERIAL AND METHOD FOR MANUFACTURING THE SAME

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 746 days.

(21) Appl. No.: 16/688,067

(22) Filed: Nov. 19, 2019

(65) Prior Publication Data

US 2020/0077618 A1 Mar. 12, 2020

Related U.S. Application Data

(63) Continuation of application No. PCT/JP2018/018461, filed on May 14, 2018.

(30) Foreign Application Priority Data

Jun. 28, 2017 (JP) ................. 2017-125901

(51) Int. Cl.
| | |
|---|---|
| *A01K 1/015* | (2006.01) |
| *B01J 20/26* | (2006.01) |
| *B01J 20/28* | (2006.01) |
| *B01J 20/32* | (2006.01) |
| *C02F 1/28* | (2023.01) |

(52) U.S. Cl.
CPC ............ *A01K 1/0155* (2013.01); *B01J 20/26* (2013.01); *B01J 20/2803* (2013.01); *B01J 20/28019* (2013.01); *B01J 20/3223* (2013.01); *B01J 20/3293* (2013.01); *C02F 1/286* (2013.01); *C02F 1/288* (2013.01)

(58) Field of Classification Search
None
See application file for complete search history.

(56) References Cited

U.S. PATENT DOCUMENTS

2011/0253055 A1 10/2011 Tang et al.
2019/0076472 A1* 3/2019 Thompson ........... A61K 9/5073

FOREIGN PATENT DOCUMENTS

| CN | 102215672 A | 10/2011 |
|---|---|---|
| JP | 2004-121036 A | 4/2004 |
| JP | 2004121036 A * | 4/2004 |

(Continued)

OTHER PUBLICATIONS

Machine translation of JP 2004121036A, pp. 1-6, provided by Applicant. (Year: 2004).*

(Continued)

*Primary Examiner* — Clare M Perrin
(74) *Attorney, Agent, or Firm* — Oliff PLC

(57) ABSTRACT

A water absorption treatment material includes a first grain and a second grain that absorb a liquid. The first grain includes a first core portion and a first coating portion. The first core portion has a grain-like shape. The first coating portion contains an adhesive material, and covers the first core portion. The second grain includes a second core portion and a second coating portion. The second core portion has a grain-like shape. The second coating portion contains an adhesive material, and covers the second core portion. The thickness of the second coating portion is smaller than the thickness of the first coating portion.

20 Claims, 4 Drawing Sheets

(56) References Cited

FOREIGN PATENT DOCUMENTS

| JP | 2007-190026 A | 8/2007 |
|---|---|---|
| JP | 2016-171785 A | 9/2016 |

OTHER PUBLICATIONS

Garland et al. (Atmos. Chem. Phys., 2005, 5, 1951-1961). (Year: 2005).*
Baker et al. (Langmuir, 1988, 4, 1055-1061). (Year: 1988).*
Pluronic F68, accessed online at https://www.usbio.net/biochemicals/286627/Pluronic-F68-PE-6800 on Dec. 7, 2022, p. 1). (Year: 2022).*
Miao et al. (Biomacromolecules, 2015, 16, 3740-3750). (Year: 2015).*
Zhang et al. (Environ. Sci. Technol., 2012, 46, 10990-10996). (Year: 2012).*
Rosinski et al. (Carbon, 2004, 42, 2139-2146). (Year: 2004).*
Jun. 19, 2018 International Search Report issued in International Patent Application No. PCT/JP2018/018461.
Jun. 19, 2018 Written Opinion of the International Preliminary Report on Patentability issued in International Patent Application No. PCT/JP2018/018461.

* cited by examiner

WATER ABSORPTION TREATMENT MATERIAL AND METHOD FOR MANUFACTURING THE SAME

CROSS REFERENCE TO RELATED APPLICATION

This is a Continuation of International Application No. PCT/JP2018/018461 filed May 14, 2018, which claims the benefit of Japanese Application No. 2017-125901 filed Jun. 28, 2017. The contents of these applications are hereby incorporated by reference in their entirety.

TECHNICAL FIELD

The present invention relates to a water absorption treatment material that absorbs a liquid, and a method for manufacturing the same.

BACKGROUND ART

A conventional water absorption treatment material is disclosed in, for example, Patent Document 1. The water absorption treatment material disclosed in Patent Document 1 is an animal excrement treatment material that contains a plurality of grains having a water absorbing property. Each grain includes a core portion that has a grain-like shape, and a coating portion that covers the core portion. The coating portion has a function of bonding grains that have absorbed a liquid when in use. Accordingly, an aggregation of a plurality of used grains is formed.

CITATION LIST

Patent Document

Patent Document 1: JP 2007-190026A

SUMMARY OF INVENTION

Technical Problem

The coating portion contributes to formation of an aggregation of used grains Therefore, to sufficiently ensure the aggregating strength of the used grains, it is advantageous that the volume of the coating portion is large. However, since the coating portion is provided so as to cover the core portion, it inhibits the liquid from quickly reaching the core portion. Thus, there has been a dilemma that the larger the volume of the coating portion becomes, the lower the water-absorptivity of the grains becomes in the conventional water absorption treatment material.

Solution to Problem

The present invention has been made in view of the problems described above, and it is an object of the present invention to provide a water absorption treatment material in which it is possible to sufficiently ensure aggregating strength of used grains while suppressing deterioration in the water-absorptivity, and a method for manufacturing the same.

A water absorption treatment material according to the present invention includes: a first grain that absorbs a liquid, the first grain including a first core portion that has a grain-like shape, and a first coating portion that contains an adhesive material and covers the first core portion; and a second grain that absorbs the liquid, the second grain including a second core portion that has a grain-like shape, and a second coating portion that contains an adhesive material and covers the second core portion, and a thickness of the second coating portion is smaller than a thickness of the first coating portion.

The water absorption treatment material includes first and second grains. The thickness of the second coating portion provided in the second grain is smaller than the thickness of the first coating portion provided in the first grain. By reducing the thickness of the second coating portion as described above, the liquid can quickly reach the second core portion. Also, the bonding effect of the first coating portion provided in the first grain is also exerted on the second grain around the first grain. For this reason, even though the thickness of the second coating portion provided in the second grain is reduced, the aggregating strength can be sufficiently ensured with regard to formation of an aggregation of used grains (first and second grains).

A method for manufacturing a water absorption treatment material according to the present invention includes: a first grain forming step of forming a first grain that absorbs a liquid; and a second grain forming step of forming a second grain that absorbs the liquid. The first grain forming step includes a first core portion forming step of forming a first core portion that has a grain-like shape, and a first coating portion forming step of forming a first coating portion that contains an adhesive material and covers the first core portion. The second grain forming step includes a second core portion forming step of forming a second core portion that has a grain-like shape, and a second coating portion forming step of forming a second coating portion that contains an adhesive material and covers the second core portion. In the second coating portion forming step, the second coating portion is formed such that a thickness of the second coating portion is smaller than a thickness of the first coating portion.

In the manufacturing method, first and second grains are formed. The thickness of the second coating portion provided in the second grain is smaller than the thickness of the first coating portion provided in the first grain. By reducing the thickness of the second coating portion as described above, the liquid can quickly reach the second core portion in the manufactured water absorption treatment material. Also, the bonding effect of the first coating portion provided in the first grain is also exerted on the second grain around the first grain. For this reason, even though the thickness of the second coating portion provided in the second grain is reduced, the aggregating strength can be sufficiently ensured with regard to formation of an aggregation of used grains (first and second grains).

Advantageous Effects of Invention

According to the present invention, it is possible to implement a water absorption treatment material in which it is possible to sufficiently ensure aggregating strength of used grains while suppressing deterioration in the water-absorptivity, and a method for manufacturing the same.

DESCRIPTION OF EMBODIMENTS

Figure 1:
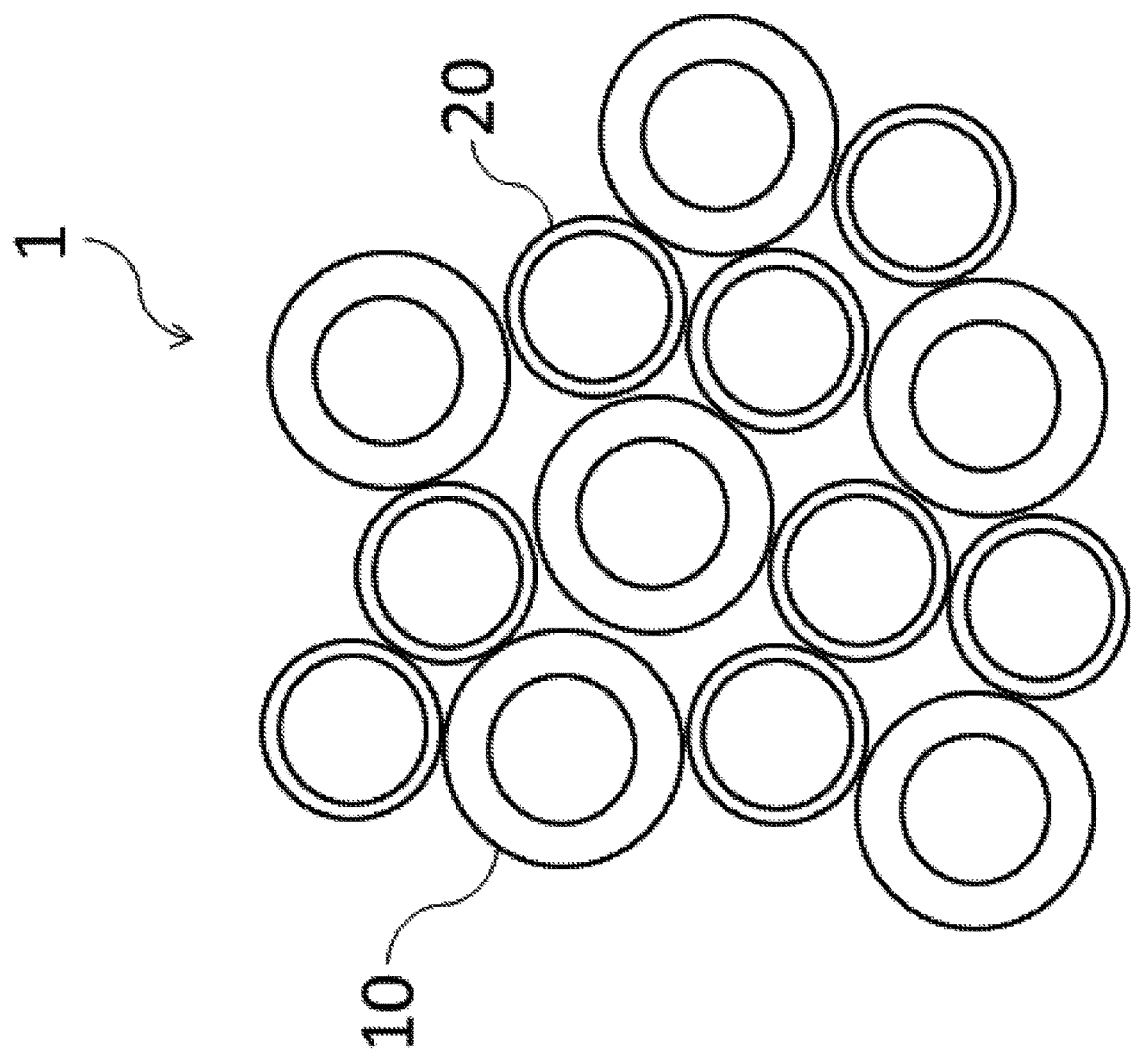
FIG. 1 is a schematic diagram of a water absorption treatment material according to an embodiment of the present invention.

Hereinafter, an embodiment of the present invention will be described in detail with reference to the drawings. In the description of the drawings, the same elements are given the same reference numerals, and a redundant description will be omitted.

FIG. 1 is a schematic diagram of a water absorption treatment material according to an embodiment of the present invention. A water absorption treatment material 1 is a water absorption treatment material composed of a plurality of grains, and includes a grain 10 (first grain) and a grain 20 (second grain). The grains 10 and 20 have a water absorbing property, and absorb a liquid to be treated. In the present embodiment, a plurality of grains 10 and a plurality of grains 20 are provided. In the water absorption treatment material 1, the grains 10 and 20 are contained in a mixed manner. The number of grains 10 is preferably 30% or more and 70% or less of the total number of grains 10 and grains 20, and more preferably 40% or more and 60% or less. The water absorption treatment material 1 is, for example, an excrement treatment material for absorption treatment of human or animal excrement.

Figure 2:
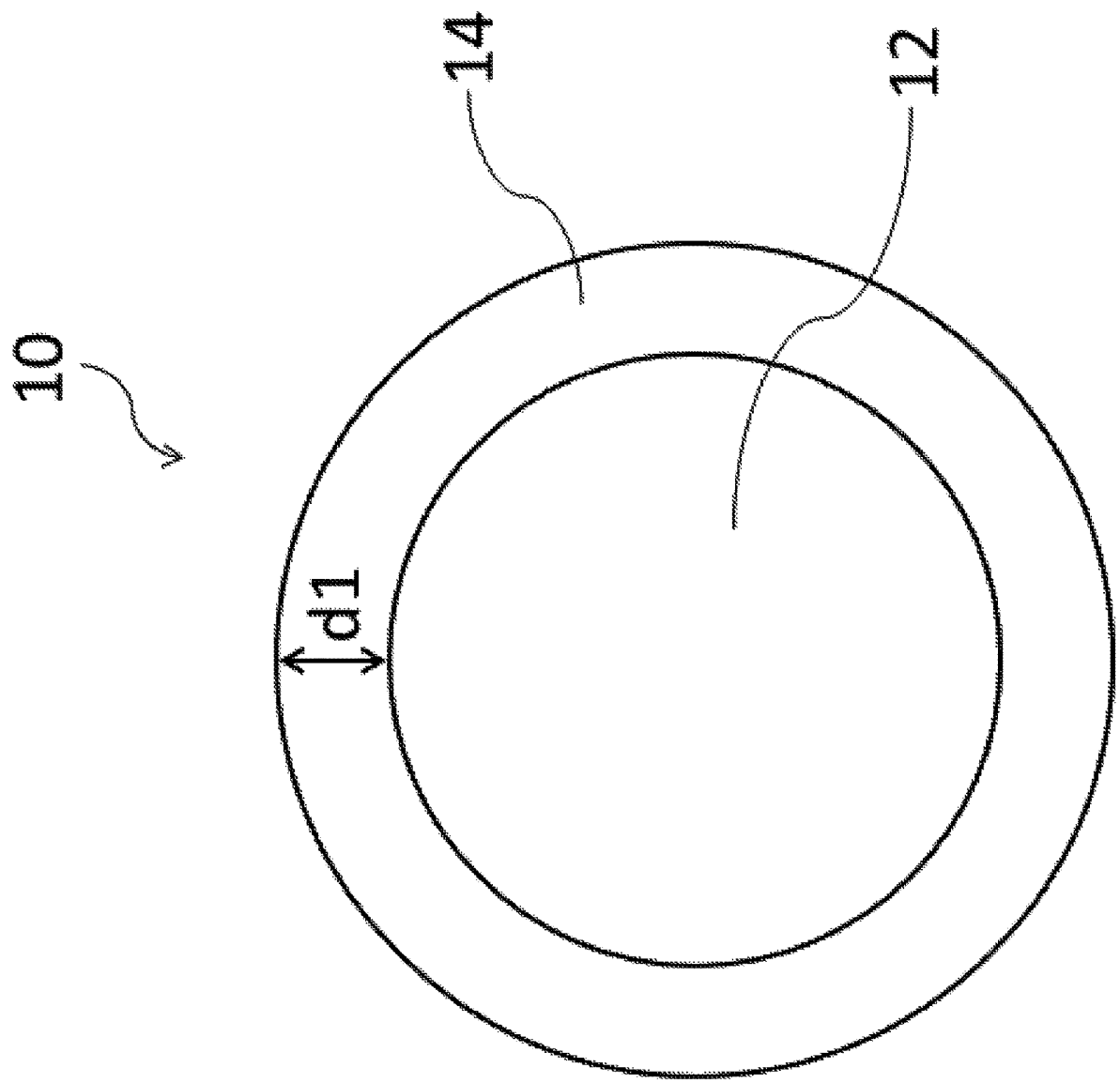
FIG. 2 is a schematic diagram of a grain 10.

FIG. 2 is a schematic diagram of the grain 10. The grain 10 includes a core portion 12 (first core portion) and a coating portion 14 (first coating portion). The core portion 12 has a grain-like shape. The grain-like shape may be, for example, spherical, cylindrical, elliptic, or the like. The core portion 12 has a function of absorbing and retaining a liquid. The core portion 12 preferably contains an organic substance as the main material. As used herein, the main material of the core portion 12 refers to one of the materials constituting the core portion 12 that accounts for the highest proportion by weight in the core portion 12. As the organic substance, it is possible to use, for example, paper, used tea leaves, plastics, or soybean refuse. The core portion 12 does not contain an adhesive material.

The paper refers to a material composed mainly of pulp. Examples of the paper include ordinary paper, a vinyl chloride wallpaper classified product (paper obtained by classifying vinyl chloride wallpaper), a fluff pulp, a paper-making sludge, a pulp sludge, and the like. As the plastics, it is possible to use, for example, a disposable diaper classified product (plastics obtained by classifying disposable diapers). The soybean refuse is preferably dried soybean refuse.

The coating portion 14 covers the core portion 12. The coating portion 14 covers the entire surface of the core portion 12 with substantially uniform thickness. The coating portion 14 has a function of bonding the grains 10 and 20 that have absorbed a liquid when in use, and aggregating them together. The coating portion 14 contains an adhesive material. As the adhesive material, it is possible to use, for example, starch, CMC (carboxymethyl cellulose), PVA (polyvinyl alcohol), dextrin, or a water-absorbent polymer. It is preferable that the coating portion 14 also contains an organic substance as the main material.

Figure 3:
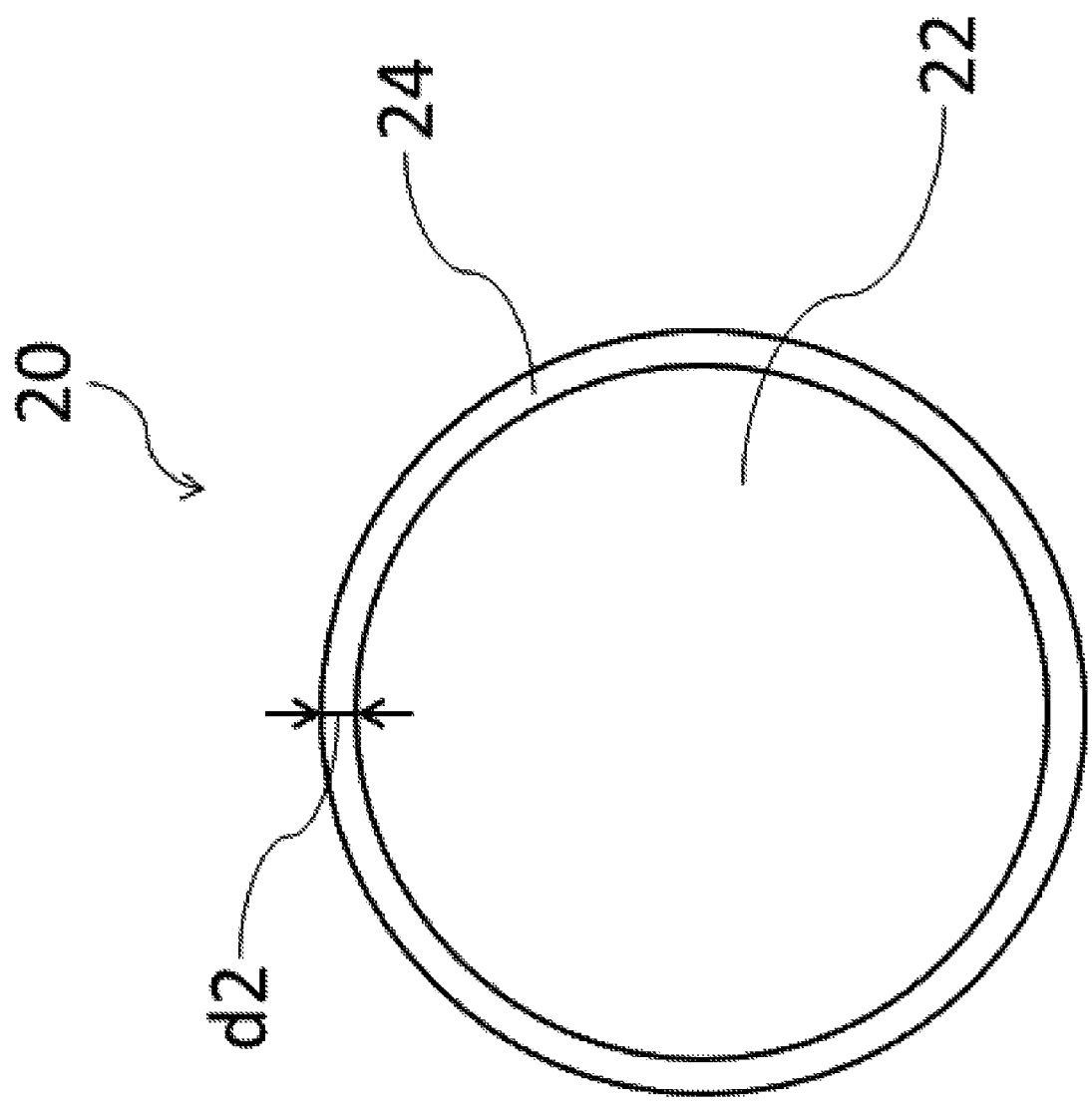
FIG. 3 is a schematic diagram of a grain 20.

FIG. 3 is a schematic diagram of the grain 20. The grain 20 includes a core portion 22 (second core portion) and a coating portion 24 (second coating portion). The core portion 22 has a grain-like shape. The core portion 22 has a function of absorbing and retaining a liquid. The core portion 22 preferably contains an organic substance as the main material. In the present embodiment, the core portion 12 and the core portion 22 are made of materials that have substantially the same composition. The core portion 22 does not contain an adhesive material. Also, the core portion 22 has a shape and a size that are substantially the same as those of the core portion 12.

The coating portion 24 covers the core portion 22. The coating portion 24 covers the entire surface of the core portion 22 with substantially uniform thickness. The coating portion 24 has a function of bonding the grains 10 and 20 that have absorbed a liquid when in use, and aggregating them together. The coating portion 24 contains an adhesive material. It is preferable that the coating portion 24 also contains an organic substance as the main material. The coating portion 14 and the coating portion 24 may be made of materials that have substantially the same composition, or may be made of materials that have mutually different compositions. The thickness d2 of the coating portion 24 is smaller than the thickness d1 (see FIG. 2) of the coating portion 14. The thickness d2 is preferably 80% or less of the thickness d1, and more preferably 50% or less of the thickness d1.

Next, an example of a method for manufacturing the water absorption treatment material 1 will be described as an embodiment of the method for manufacturing a water absorption treatment material according to the present invention. The manufacturing method includes a first grain forming step, and a second grain forming step.

The first grain forming step is a step of forming the grain 10. This step includes a first core portion forming step, and a first coating portion forming step. The first core portion forming step is a step of forming the core portion 12. In this step, the core portion 12 is formed by granulating a core portion material (a material for constituting the core portion 12) by using a granulation apparatus. In the present embodiment, a plurality of core portions 12 are formed. As the granulation apparatus, for example, an extrusion granulator can be used. Prior to granulation, the core portion material is subjected to pre-treatment such as pulverization, kneading, and adding water, as needed.

The first coating portion forming step is a step of forming the coating portion 14. In this step, the coating portion 14 is formed by attaching a coating material to the surface of the core portion 12 by using a coating apparatus or the like. The coating material contains an adhesive material. The coating material may be attached by, for example, sprinkling or spraying the coating material. In this way, the grains 10 are obtained.

The second grain forming step is a step of forming the grain 20. This step includes a second core portion forming step, and a second coating portion forming step. The second core portion forming step is a step of forming the core portion 22. In this step, the core portion 22 is formed by granulating a core portion material (a material for constituting the core portion 22) by using a granulation apparatus. In the present embodiment, a plurality of core portions 22 are formed.

The second coating portion forming step is a step of forming the coating portion 24. In this step, the coating portion 24 is formed by attaching a coating material to the surface of the core portion 22 by using a coating apparatus or the like. The coating material also contains an adhesive material. At this time, the coating portion 24 is formed such that the thickness of the coating portion 24 is smaller than the thickness of the coating portion 14. The coating portion 24 is formed such that the thickness of the coating portion 24 is preferably 80% or less of the thickness of the coating portion 14, and more preferably 50% or less of the thickness of the coating portion 14. In this way, the grains 20 are obtained.

Figure 4:
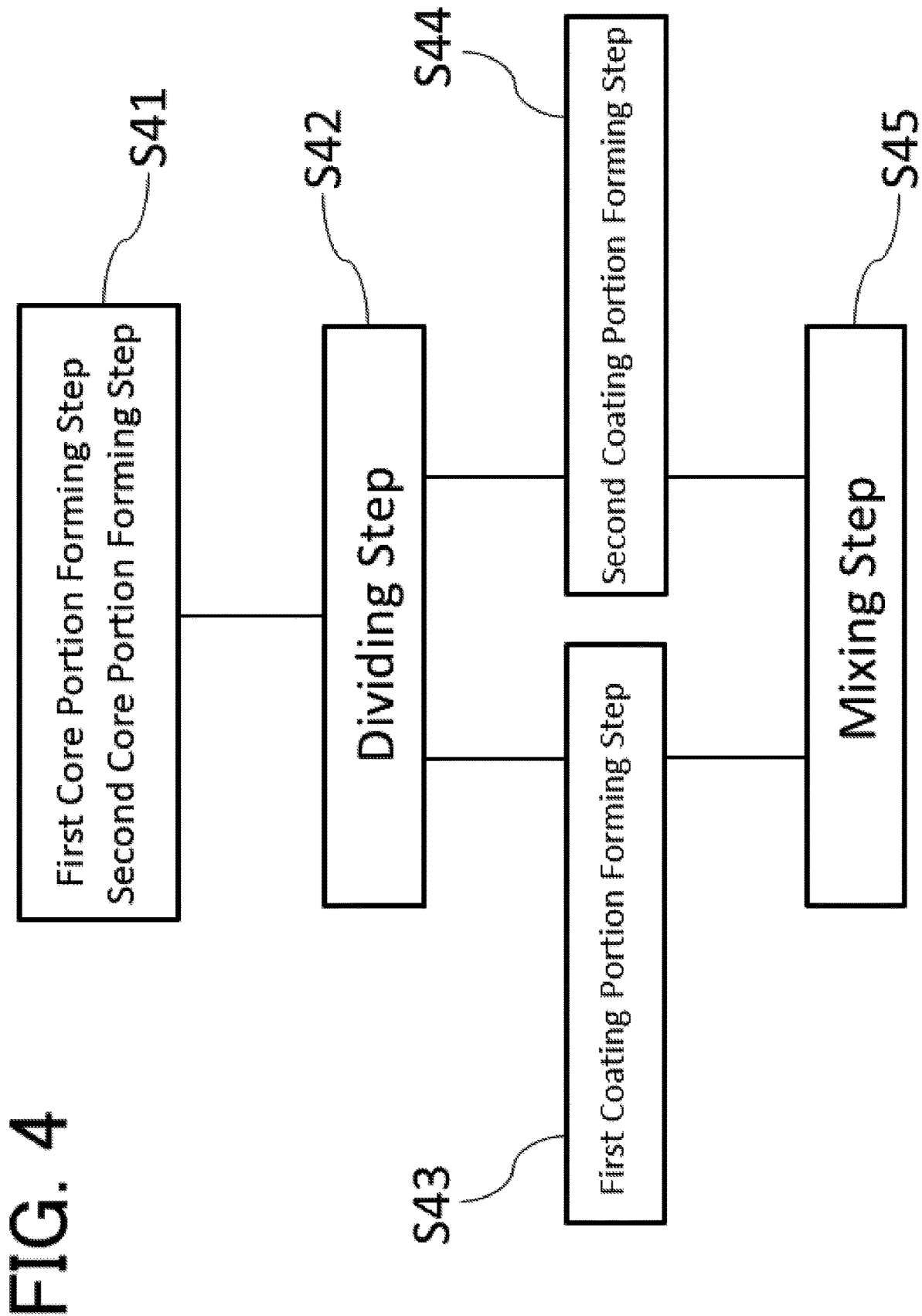
FIG. 4 is a diagram illustrating a flow of a manufacturing method according to an embodiment.

FIG. 4 is a diagram illustrating a flow of the manufacturing method according to the present embodiment. In the present embodiment, the second core portion forming step is performed simultaneously with the first core portion forming step by using the same apparatus (step S41). That is, the first and second core portion forming steps are performed as a single step. In this step, the same core portion material is granulated by using a granulation apparatus so as to form a plurality of granules that will serve as the core portions 12 and the core portions 22. After that, a dividing step is performed (step S42). The dividing step is a step of dividing the plurality of granules into a first group and a second group at a predetermined ratio. The granules in the first group will serve as the core portions 12, and the granules in the second group will serve as the core portions 22.

In the first coating portion forming step (step S43), the coating portion 14 is formed on each of the granules in the first group. In the second coating portion forming step (step S44), the coating portion 24 is formed on each of the granules in the second group. The first coating portion forming step and the second coating portion forming step may be performed simultaneously, or may be performed in sequence. In the latter case, the first coating portion forming step may be performed prior to the second coating portion forming step, or the second coating portion forming step may be performed prior to the first coating portion forming step.

The mixing step (step S45) is a step of mixing the grains 10 formed in the first grain forming step and the grains 20 formed in the second grain forming step. In this step, it is preferable to mix the grains 10 and the grains 20 such that the number of grains 10 is 30% or more and 70% or less of the total number of grains 10 and grains 20. It is more preferable to mix the grains 10 and the grains 20 such that the number of grains 10 is 40% or more and 60% or less of the total number of grains 10 and grains 20. In this step, the mixed grains 10 and 20 are preferably stirred. In this way, the water absorption treatment material 1 that contains the grains 10 and the grains 20 in a mixed manner is obtained.

Advantageous effects of the present embodiment will be described. In the present embodiment, the grain 10 and the grain 20 are formed. The thickness of the coating portion 24 provided in the grain 20 is smaller than the thickness of the coating portion 14 provided in the grain 10. By reducing the thickness of the coating portion 24 as described above, the liquid can quickly reach the core portion 22 in the water absorption treatment material 1. Also, the bonding effect of the coating portion 14 provided in the grain 10 is also exerted on the grain 20 around the grain 10. For this reason, even though the thickness of the coating portion 24 provided in the grain 20 is reduced, the aggregating strength can be sufficiently ensured with regard to formation of an aggregation of used grains 10, 20. Accordingly, the water absorption treatment material 1 in which it is possible to sufficiently ensure the aggregating strength of used grains 10, 20 while suppressing deterioration in the water-absorptivity, and a method for manufacturing the same are implemented.

The smaller the thickness of the coating portion 24 becomes, the more quickly the liquid can reach the core portion 22. From this viewpoint, the thickness of the coating portion 24 is preferably 80% or less of the thickness of the coating portion 14, and more preferably 50% or less.

Also, reducing the thickness of the coating portion 24 leads to saving the usage amount of the coating material and reduction in the manufacturing cost of the water absorption treatment material 1. To save the usage amount of the coating material, it is advantageous that the grains 10 account for a smaller proportion in the entire water absorption treatment material 1. From this viewpoint, the number of grains 10 is preferably 70% or less of the total number of grains 10 and grains 20, and more preferably 60% or less. If, on the other hand, the proportion of the grains 10 is too small, the bonding effect of the coating portion 14 will be insufficient, which may hinder used grains 10 and 20 from forming an aggregation. From this viewpoint, the number of grains 10 is preferably 30% or more of the total number of grains 10 and grains 20, and more preferably 40% or more.

The coating portions (coating portions 14, 24) are provided in both of the grains 10 and the grains 20. Accordingly, bonding of the coating portions between the used grains 10, 20 is obtained, and therefore an aggregation of the grains 10, 20 can be more stably formed than in the case where the coating portions are provided in only one of the grain 10 or grain 20.

The core portion 12 and the core portion 22 are made of materials that have substantially the same composition. Accordingly, it is possible to use the same core portion material as the core portion material for forming the core portion 12 and the core portion material for forming the core portion 22. In addition, the core portion 12 and the core portion 22 have substantially the same shape and size. Accordingly, it is possible to use the same granulation apparatus as the granulation apparatus for forming the core portion 12 and the granulation apparatus for forming the core portion 22.

In the case where the core portion 12 and the core portion 22 are made of materials that have substantially the same composition, and have substantially the same shape and size, the core portion 12 and the core portion 22 can be formed simultaneously by using the same apparatus. In fact, in the present embodiment, the first and second core portion forming steps are performed simultaneously by using the same apparatus. With this configuration, it is possible to efficiently manufacture the water absorption treatment material 1 that contains the grains 10 and the grains 20 in a mixed manner. This also leads to reduction in the manufacturing cost of the water absorption treatment material 1.

In the first and second core portion forming steps, a plurality of granules that will serve as core portions 12 and 22 are formed by granulating the core portion material by using a granulation apparatus. After that, the dividing step is performed, and the granules are divided into a core portion 12-forming granule group (first group) and a core portion 22-forming granule group (second group). In this way, the granules formed in the first and second core portion forming steps are subjected to the dividing step, and the granules are determined as either core portion 12-forming granules or core portion 22-forming granules. Accordingly, during the first and second core portion forming steps, the granules can be handled without the need to make distinction between core portion 12-forming granules and core portion 22-forming granules. For this reason, in the present embodiment, irrespective of the fact that two types of grains (grains 10 and 20) are formed, the first and second core portion forming steps can be performed as a single step as in the case where only one type of grains are formed.

The core portion 12 and the core portion 22 do not contain an adhesive material. Accordingly, it is possible to save the usage amount of adhesive material that is a relatively expensive material, and further reduce the manufacturing cost of the water absorption treatment material 1.

Because water-absorbent polymers have the property of swelling upon absorbing a liquid, the coating portion 14 that contains a water-absorbent polymer deforms and spreads outward around the grain 10 upon absorbing a liquid. As a result, the coating portion 14 merges with the surrounding grains 20, as a result of which an aggregation of grains 10 and 20 is formed. Accordingly, it is particularly suitable to use a water-absorbent polymer as the adhesive material contained in the coating portion 14.

In the case where the core portion 12 and the coating portion 14 contain an organic substance as the main material, it is possible to obtain grains 10 suitable for being disposed of by incineration. Likewise, in the case where the core portion 22 and the coating portion 24 contain an organic substance as the main material, it is possible to obtain grains 20 suitable for being disposed of by incineration. When the grains 10 and 20 are suitable for being disposed of by incineration, the water absorption treatment material 1 after use can be discarded as combustible trash, and it is therefore possible to improve convenience for the users.

In the case where the coating portion 14 and the coating portion 24 are made of materials that have substantially the same composition, it is possible to use the same coating material as the coating material for forming the coating portion 14 and the coating material for forming the coating portion 24.

The present invention is not limited to the embodiment given above, and various modifications can be made. In the embodiment given above, an example has been shown in which the first and second core portion forming steps are performed simultaneously by using the same apparatus. However, the first and second core portion forming steps may be performed simultaneously by using different apparatuses. Alternatively, the first and second core portion forming steps may be performed in sequence by using the same apparatus or different apparatuses. In this case, the first core portion forming step may be performed prior to the second core portion forming step, or the second core portion forming step may be performed prior to the first core portion forming step.

In the embodiment given above, an example has been shown in which the core portion 12 and the core portion 22 are made of materials that have substantially the same composition. However, the core portion 12 and the core portion 22 may be made of materials that have mutually different compositions. Also, in the embodiment given above, an example has been shown in which the core portion 12 and the core portion 22 have substantially the same shape and size. However, the core portion 12 and the core portion 22 may have mutually different shapes and sizes.

In the embodiment given above, the second coating portion forming step may be performed simultaneously with the first coating portion forming step by using the same apparatus. For example, it is conceivable to add the core portion 22 to a coating apparatus after the coating material is attached to the core portion 12 for a fixed time in a state in which only the core portion 12 is accommodated in the coating apparatus, and continue to attach the coating material to both of the core portion 12 and the core portion 22 in a state in which the core portion 12 and the core portion 22 are accommodated in the coating apparatus. Accordingly, processing time for the core portion 12 is longer than processing time for the core portion 22 in the coating apparatus, and it is therefore possible to form the coating portion (coating portion 14) having relatively large thickness on the core portion 12 and form the coating portion (coating portion 24) having relatively small thickness on the core portion 22.

LIST OF REFERENCE NUMERALS

1 Water Absorption Treatment Material
10 Grain (First Grain)
12 Core Portion (First Core Portion)
14 Coating Portion (First Coating Portion)
20 Grain (Second Grain)
22 Core Portion (Second Core Portion)
24 Coating Portion (Second Coating Portion)

The invention claimed is:

1. A water absorption treatment material comprising:
a first grain that absorbs a liquid, the first grain including a first core portion that has a granular shape, and a first coating portion that contains an adhesive material and covers the first core portion, the first coating portion having a single-layer structure; and
a second grain that absorbs the liquid, the second grain including a second core portion that has a granular shape, and a second coating portion that contains an adhesive material and covers the second core portion, the second coating portion having a single-layer structure,
wherein a thickness of the second coating portion is smaller than a thickness of the first coating portion, and
wherein the first core portion and the second core portion include paper, used tea leaves, or soybean refuse as respective main materials.

2. The water absorption treatment material according to claim 1,
wherein the thickness of the second coating portion is 80% or less of the thickness of the first coating portion.

3. The water absorption treatment material according to claim 2,
wherein the thickness of the second coating portion is 50% or less of the thickness of the first coating portion.

4. The water absorption treatment material according to claim 1,
wherein a plurality of the first grains and a plurality of the second grains are provided.

5. The water absorption treatment material according to claim 4,
wherein the number of the first grains is 30% or more and 70% or less of a total number of the first and second grains.

6. The water absorption treatment material according to claim 5,
wherein the number of the first grains is 40% or more and 60% or less of the total number of the first and second grains.

7. The water absorption treatment material according to claim 1,
wherein the first core portion and the second core portion are made of materials that have substantially the same composition.

8. The water absorption treatment material according to claim 1,
wherein the first core portion and the second core portion have substantially the same shape and size.

9. The water absorption treatment material according to claim 1,
wherein the adhesive material contained in the first coating portion is a water-absorbent polymer.

10. The water absorption treatment material according to claim 1,
wherein the first and second core portions do not contain an adhesive material.

11. The water absorption treatment material according to claim 1,
wherein the first coating portion and the second coating portion are made of materials that have substantially the same composition.

12. A method for manufacturing a water absorption treatment material, the method comprising:
a first grain forming step of forming a first grain that absorbs a liquid; and
a second grain forming step of forming a second grain that absorbs the liquid,
wherein the first grain forming step includes a first core portion forming step of forming a first core portion that has a granular shape, and a first coating portion forming step of forming a first coating portion that contains an adhesive material and covers the first core portion, the first coating portion having a single-layer structure,
the second grain forming step includes a second core portion forming step of forming a second core portion that has a granular shape, and a second coating portion forming step of forming a second coating portion that contains an adhesive material and covers the second core portion, the second coating portion having a single-layer structure,
in the second coating portion forming step, the second coating portion is formed such that a thickness of the second coating portion is smaller than a thickness of the first coating portion, and
the first core portion and the second core portion include paper, used tea leaves, or soybean refuse as respective main materials.

13. The method for manufacturing a water absorption treatment material according to claim 12,
wherein in the first grain forming step, a plurality of the first grains are formed, and
in the second grain forming step, a plurality of the second grains are formed.

14. The method for manufacturing a water absorption treatment material according to claim 13, comprising
a mixing step of mixing the plurality of the first grains and the plurality of the second grains.

15. The method for manufacturing a water absorption treatment material according to claim 14,
wherein in the mixing step, the first and second grains are mixed such that the number of the first grains is 30% or more and 70% or less of a total number of the first and second grains.

16. The method for manufacturing a water absorption treatment material according to claim 12,
wherein the first core portion forming step and the second core portion forming step are performed simultaneously by using the same apparatus.

17. The method for manufacturing a water absorption treatment material according to claim 16,
wherein in the first and second core portion forming steps, a plurality of granules that serve as the first and second core portions are formed by granulating a core portion material by using a granulation apparatus.

18. The method for manufacturing a water absorption treatment material according to claim 17, comprising
a dividing step of dividing the plurality of granules into a first group and a second group,
wherein in the first coating portion forming step, the first coating portion is formed on the granules in the first group, and
in the second coating portion forming step, the second coating portion is formed on the granules in the second group.

19. The method for manufacturing a water absorption treatment material according to claim 12,
wherein the adhesive material contained in the first coating portion is a water-absorbent polymer.

20. The method for manufacturing a water absorption treatment material according to claim 12,
wherein in the first and second core portion forming steps, the first and second core portions that do not contain an adhesive material are formed respectively.

* * * * *